(12) United States Patent
Huszar et al.

(10) Patent No.: US 11,537,869 B2
(45) Date of Patent: Dec. 27, 2022

(54) DIFFERENCE METRIC FOR MACHINE LEARNING-BASED PROCESSING SYSTEMS

(71) Applicant: Twitter, Inc., San Francisco, CA (US)

(72) Inventors: Ferenc Huszar, Cambridge (GB); Lucas Theis, London (GB); Pietro Berkes, London (GB)

(73) Assignee: Twitter, Inc., San Francisco, CA (US)

( * ) Notice: Subject to any disclaimer, the term of this patent is extended or adjusted under 35 U.S.C. 154(b) by 1081 days.

(21) Appl. No.: 15/855,499

(22) Filed: Dec. 27, 2017

(65) Prior Publication Data

US 2018/0240017 A1 Aug. 23, 2018

Related U.S. Application Data

(60) Provisional application No. 62/460,454, filed on Feb. 17, 2017.

(51) Int. Cl.
*G06Q 50/22* (2018.01)
*G06N 3/08* (2006.01)
(Continued)

(52) U.S. Cl.
CPC ............ *G06N 3/08* (2013.01); *G06F 16/122* (2019.01); *G06F 16/54* (2019.01); *G06N 3/0454* (2013.01)

(58) Field of Classification Search
CPC ........ G06N 3/08; G06N 3/0454; G06T 7/001; G06T 2207/20084; G06K 9/64; G06F 16/122; G06F 16/54
(Continued)

(56) References Cited

U.S. PATENT DOCUMENTS 5,822,742 A * 10/1998 Alkon ...................... G06N 3/04
706/31
9,251,437 B2 * 2/2016 Krizhevsky .......... G06K 9/6255
(Continued)

FOREIGN PATENT DOCUMENTS

JP 2005258480 A 9/2005

OTHER PUBLICATIONS

Zhu L., et al., (2016) Bayesian Neural Networks Based Bootstrap Aggregating for Tropical Cyclone Tracks Prediction in South China Sea. https://doi.org/10.1007/978-3-319-46675-0_52 (Year: 2016).*
(Continued)

*Primary Examiner* — Brandon S Cole
(74) *Attorney, Agent, or Firm* — Brake Hughes Bellerman LLP

(57) ABSTRACT

Systems and methods provide a learned difference metric that operates in a wide artifact space. An example method includes initializing a committee of deep neural networks with labeled distortion pairs, iteratively actively learning a difference metric using the committee and psychophysics tasks for informative distortion pairs, and using the difference metric as an objective function in a machine-learned digital file processing task. Iteratively actively learning the difference metric can include providing an unlabeled distortion pair as input to each of the deep neural networks in the committee, a distortion pair being a base image and a distorted image resulting from application of an artifact applied to the base image, obtaining a plurality of difference metric scores for the unlabeled distortion pair from the deep neural networks, and identifying the unlabeled distortion pair as an informative distortion pair when the difference metric scores satisfy a diversity metric.

20 Claims, 6 Drawing Sheets

(51) Int. Cl.
*G06N 3/04* (2006.01)
*H04N 5/232* (2006.01)
*G06F 16/11* (2019.01)
*G06F 16/54* (2019.01)

(58) Field of Classification Search
USPC .................................................. 706/1–62
See application file for complete search history.

(56) References Cited

U.S. PATENT DOCUMENTS

| | | | | |
|---|---|---|---|---|
| 9,530,047 | B1* | 12/2016 | Tang | G06K 9/4652 |
| 10,133,933 | B1* | 11/2018 | Fisher | H04N 5/247 |
| 10,936,947 | B1* | 3/2021 | Flunkert | G06N 3/08 |
| 2012/0233100 | A1* | 9/2012 | Camerer | G06N 7/005 |
| | | | | 706/12 |
| 2016/0070956 | A1* | 3/2016 | Lu | G06K 9/6232 |
| | | | | 382/118 |
| 2016/0306844 | A1* | 10/2016 | Frank | G06N 7/005 |
| 2016/0358321 | A1* | 12/2016 | Xu | G06N 3/0454 |
| 2017/0039456 | A1* | 2/2017 | Saberian | G06N 3/084 |
| 2017/0286809 | A1* | 10/2017 | Pankanti | G06N 3/04 |
| 2017/0300514 | A1* | 10/2017 | Yan | G06K 9/00268 |
| 2018/0107925 | A1* | 4/2018 | Choi | G06N 3/082 |
| 2018/0240017 | A1* | 8/2018 | Huszar | G06F 16/54 |
| 2019/0150006 | A1* | 5/2019 | Yang | G06N 3/0481 |
| | | | | 455/422.1 |

OTHER PUBLICATIONS

Burbidge, et al., Dec. 16, 2007, "Active Learning for Regression Based on Query by Committee", Intelligent Data Engineering and Automated Learning—Ideal 2007 (Year: 2007).*

Jayaraman, et al., Nov. 4, 2012, "Objective Quality Assessment of Multiply Distorted Images", Asilomar Conference on Signals, Systems and Computers, Conference Record, IEEE Computer Society, pp. 1693-1697 (Year: 2012).*

Houlsby, et al., Dec. 30, 2011, "Bayesian Active Learning for Classication and Preference Learning", retrieved from https://arxiv.org/abs/1112.5745, pp. 9-12. (Year: 2011).*

Raychaudhuri, et al.,Nov. 27, 1995, "Minimisation of Data Collection by Active Learning", IEEE International Conference on Neural Networks, vol. 3, pp. 1-3. (Year: 1995).*

Mathworks, "imnoise" Jan. 3, 2017, Retrieved from the internet <URL: https://www.mathworks.com/help/images/ref/imnoise.html#:~:text=If%20the%20input%20image%20is,same%20class%20as%20the%20input.> (Year: 2017).*

International Search Report and Written Opinion for PCT Application No. PCT/US2017/068703, dated Jul. 27, 2018, 17 pages.

Burbidge, et al., "Active Learning for Regression Based on Query by Committee", Intelligent Data Engineering and Automated Learning—Ideal 2007, Dec. 16, 2007, pp. 209-218.

Jayaraman, et al., "Objective Quality Assessment of Multiply Distorted Images", Asilomar Conference on Signals, Systems and Computers, Conference Record, IEEE Computer Society, Nov. 4, 2012, pp. 1693-1697.

Johnson, et al., "Perceptual Losses for Real-Time Style Transfer and Super-Resolution", arxiv.org, Cornell University Library, Mar. 27, 2016, 18 pages.

Raychaudhuri, et al., "Minimisation of Data Collection by Active Learning", IEEE International Conference on Neural Networks, vol. 3, Nov. 27, 1995, 4 pages.

Abe, et al, "Query Learning Strategies Using Boosting and Bagging", ICML '98 Proceedings of the Fifteenth International Conference on Machine Learning, Jul. 24-27, 1998, 9 pages.

Houlsby, et al, "Bayesian Active Learning for Classication and Preference Learning", retrieved from https://arxiv.org/abs/1112.5745, Dec. 30, 2011, 17 pages.

Li, et al, "Toward A Practical Perceptual Video Quality Metric", The Netflix Tech Blog, retrieved from http://techblog.netflix.com/2016/06/toward-practical-perceptual-video.html, Jun. 6, 2016, 11 pages.

Rubin, "The Bayesian Bootstrap", The Annals of Statistics, vol. 9, No. 1, 1981, pp. 130-134.

Communication pursuant to Article 94(3) EPC for European Application No. 17868488.2, dated Oct. 29, 2020, 15 pages.

* cited by examiner

DIFFERENCE METRIC FOR MACHINE LEARNING-BASED PROCESSING SYSTEMS

This application is a non-provisional of, and claims priority to, U.S. Provisional Application No. 62/460,454, filed Feb. 17, 2017, titled "Difference Metric for Machine Learning-based Processing Systems," the disclosure of which is incorporated herein by reference.

BACKGROUND

Machine learning is the field of study where a computer or computers learn to perform classes of tasks using the feedback generated from the experience or data that the machine learning process acquires during computer performance of those tasks. Typically, machine learning can be broadly classed as supervised and unsupervised approaches, although there are particular approaches such as reinforcement learning and semi-supervised learning that have special rules, techniques and/or approaches.

Supervised machine learning relates to a computer learning one or more rules or functions to map between example inputs and desired outputs as predetermined by an operator or programmer, usually where a data set containing the inputs is labelled. Supervised machine learning techniques require labeled data points. For example, to learn a classifier that classifies images, the classifier needs to be trained on a set of correctly classified images. Typically, these labels are costly to obtain, because they need human expert input, or, in other words, human raters. Unsupervised learning relates to determining a structure for input data, for example, when performing pattern recognition, and typically uses unlabeled data sets. Reinforcement learning relates to enabling a computer or computers to interact with a dynamic environment, for example, when playing a game or driving a vehicle. Various hybrids of these categories are possible, such as "semi-supervised" machine learning, in which a training data set has been labelled only partially.

For unsupervised machine learning, there is a range of possible applications such as, for example, the application of computer vision techniques to image processing or video enhancement. Unsupervised machine learning is typically applied to solve problems where an unknown data structure might be present in the input data. As the data is unlabeled, the machine learning process identifies implicit relationships between the data, for example, by deriving a clustering metric based on internally derived information. For example, an unsupervised learning technique can be used to reduce the dimensionality of a data set and to attempt to identify and model relationships between clusters in the data set, and can, for example, generate measures of cluster membership or identify hubs or nodes in or between clusters (for example, using a technique referred to as weighted correlation network analysis, which can be applied to high-dimensional data sets, or using k-means clustering to cluster data by a measure of the Euclidean distance between each datum).

Semi-supervised learning is typically applied to solve problems where there is a partially labelled data set, for example, where only a subset of the data is labelled. Semi-supervised machine learning makes use of externally provided labels and objective functions as well as any implicit data relationships. Active learning is a special case of semi-supervised learning, in which the system queries a user or users to obtain additional data points and uses unlabeled data points to determine which additional data points to provide to the user for labeling.

When initially configuring a machine learning system, particularly when using a supervised machine learning approach, the machine learning algorithm can be provided with some training data or a set of training examples, in which each example is typically a pair of an input signal/vector and a desired output value, label (or classification) or signal. The machine learning algorithm analyses the training data and produces a generalized function that can be used with unseen data sets to produce desired output values or signals for the unseen input vectors/signals.

The use of unsupervised or semi-supervised machine learning approaches are sometimes used when labelled data is not readily available, or where the system generates new labelled data from unknown data given some initial seed labels.

Deep learning techniques, e.g., those that use a deep neural network for the machine learning system, differ from conventional neural networks and support vector machines (SVMs) in that deep learning increases the number of hidden layers. Because of this, deep learning works best when the number of training examples is large, e.g., millions or tens of millions, making supervised training of a deep learning classifier impractical. Current training approaches for most machine learning algorithms can take significant periods of time, which delays the utility of machine learning approaches and also prevents the use of machine learning techniques in a wider field of potential application.

Low-level vision applications and other signal processing systems (image/video/sound quality enhancement, lossy image/sound compression) use a metric to quantify differences in digital files, e.g., images or sound files. These difference metrics, for example, take a reference image and a changed image, and quantify differences between the two files. In some implementations, the difference metrics quantify how a human observer will perceive the quality of the changed image. Some such difference metrics may be referred to as perceptual loss functions. Current difference metrics include peak-signal-to-noise-ratio (PSNR) or structural similarity (SSIM). PSNR and SSIM and their variants. Some current difference metrics correlate to human judgments in limited scenarios, e.g., certain types of distortions, and do not scale.

SUMMARY

Implementations provide a flexible, trainable difference metric using representations built by deep neural networks. Unlike conventional difference metrics, the learned difference metric can fully capture human quality perception for many different distortion types and, because it is trainable, the difference metric can learn to capture human quality perception for any distortion. Implementations thus include systems and methods that explore and capture human quality perception in the space of all possible distortions. Implementations enable the difference metric to be learned using a small set of labeled training data obtained via adaptive psychophysics experiments. The system may use the adaptive psychophysics experiments in an active learning system that uses Bayesian bootstrapping. The difference metric can be used in place of conventional difference metrics, e.g., as the objective function used in any machine-learning digital file processing task, such as lossy image or audio compression, image/video/audio quality enhancement, etc.

In one aspect, a method includes initializing a committee of deep neural networks with labeled distortion pairs, iteratively actively learning a difference metric using the committee and psychophysics tasks for informative distortion pairs, and using the difference metric as an objective function in a machine-learned digital file processing task.

In one aspect, a computer-readable medium stores a deep neural network that was trained to provide a difference metric, the training including initializing a committee of deep neural networks using different sets of labeled training distortion pairs, and iteratively training the committee of deep neural networks until convergence. Iteratively training the committee of deep neural networks may include identifying a plurality of informative distortion pairs, by providing unlabeled distortion pairs to the committee and selecting the unlabeled distortion pairs with highest diversity in the difference metric scores of the deep neural networks in the committee, obtaining labels for the informative distortion pairs, and retraining the committee of deep neural networks using the labels for the informative distortion pairs.

In one aspect, a system includes at least one processor and an artifact engine for generating unlabeled distortion pairs. The artifact engine may generate the unlabeled distortion pairs by, for each base file, generating a respective distorted file from the base file. The system also includes a labeling user interface for obtaining labels for unlabeled distortion pairs and a perceptual loss committee. The perceptual loss committee includes a plurality of deep neural networks, each deep neural network having a respective perceptual loss function. The system further includes memory storing instructions that, when executed by the at least one processor, cause the system to perform operations. The operations include learning a perceptual loss function by generating, using the artifact engine, a plurality of unlabeled distortion pairs, obtaining, from the committee, a respective set of perceptual loss scores for each of the plurality of unlabeled distortion pairs, the respective set including a perceptual loss score from each of the deep neural networks, identifying a set of distortion pairs from the plurality of unlabeled distortion pairs, each distortion pair in the set of distortion pairs having a respective set of perceptual loss scores that satisfies a diversity metric, obtaining, using the user interface, a respective labeled perception score for each distortion pair in the set of distortion pairs, and training the deep neural networks using the respective labeled perception score as a training example for the distortion pair. The operations also include using the perceptual loss function as an objective function in a machine-learning based digital file processing task.

In another aspect, a computer program product embodied on a computer-readable storage device includes instructions that, when executed by at least one processor formed in a substrate, cause a computing device to perform any of the disclosed methods, operations, or processes disclosed herein.

One or more of the implementations of the subject matter described herein can be implemented so as to realize one or more of the following advantages. As one example, the system develops a trained difference metric from a much smaller set of labelled data than is conventionally used to train a deep learning system. For example, rather than using tens of millions of labeled data points to train a strong model, the system can train the model with under ten thousand labeled data points, many of those identified during the training. Thus, the system reduces the number of hand-labeled examples needed to learn an effective model. As collecting training data is one of the biggest time and resource consuming parts of supervised machine learning, the system represents a significant advantage to generating an effective difference metric over current methods. As another example, implementations provide a systematic way to build a powerful difference metric that can be continuously improved by collecting more data. As another example, implementations rely on free-form artifacts introduced by deep neural networks, making the difference metric applicable to any number of artifacts. This differs markedly from known difference metrics that use machine learning to fit the loss function to human quality data because the datasets used in the machine learning of the known difference metrics contain only a limited set of hand-selected artifacts and because the known difference metrics simply combine a discrete number of other perceptual metrics into one. Thus, known techniques lack the breadth and scalability of disclosed implementations. As another example, the system improves training efficiency and reduces training time compared to conventional supervised learning by selecting highly relevant examples to advance the training.

The details of one or more implementations are set forth in the accompanying drawings and the description below. Other features will be apparent from the description and drawings, and from the claims.

BRIEF DESCRIPTION OF DRAWINGS

Like reference symbols in the various drawings indicate like elements.

DETAILED DESCRIPTION

Figure 1:
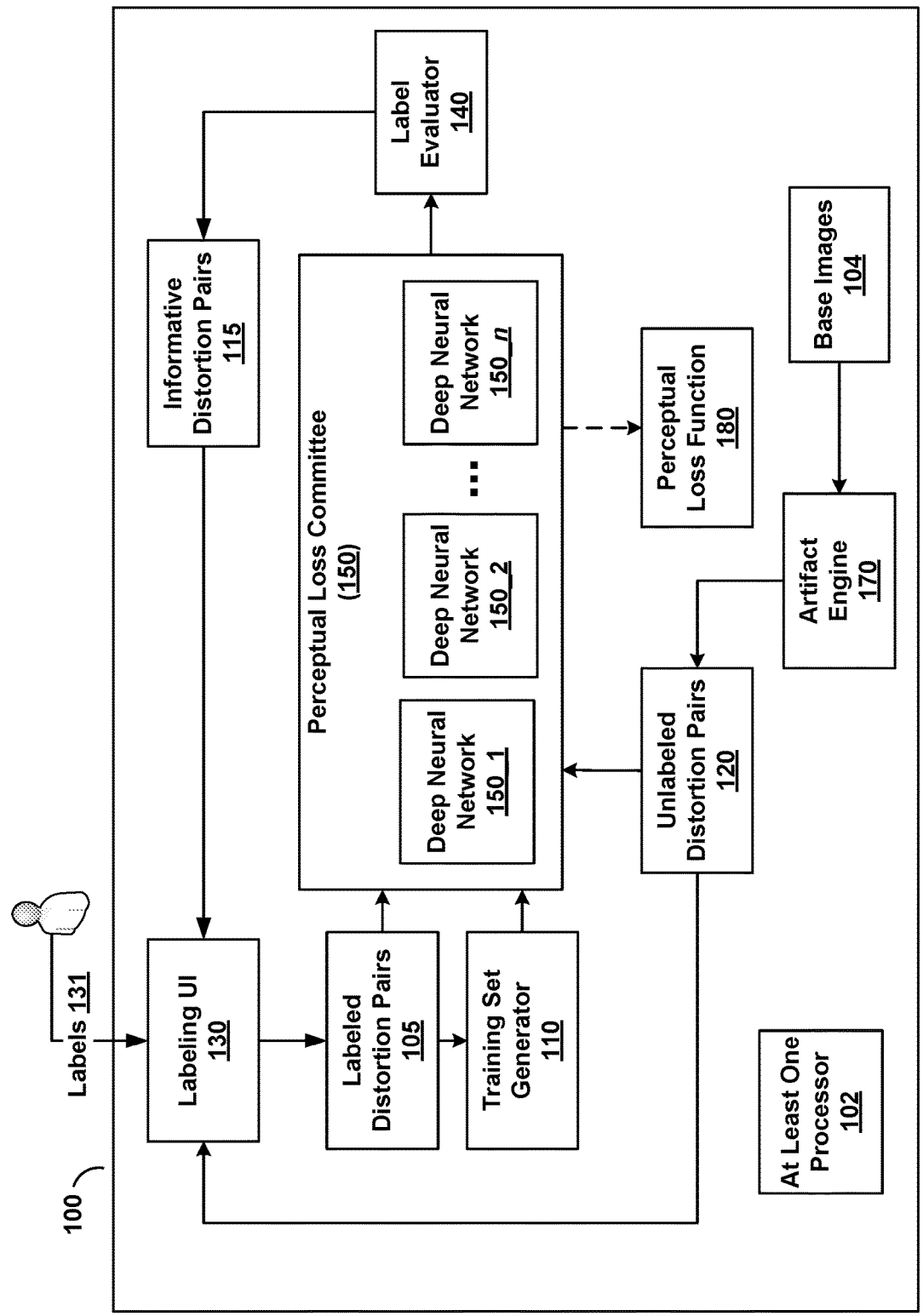
FIG. 1 illustrates an example system for learning the difference metric, in accordance with the disclosed subject matter.

FIG. 1 is a block diagram of an active learning system 100 in accordance with an example implementation. The system 100 may be used to build a highly accurate difference metric applicable to any number of artifact spaces that can be used as the objective function for any machine-learned digital file processing system. The systems and methods described result in a learned difference metric with minimized input from a human user. The systems and methods are scalable and can be used to provide a perceptual loss score for any number of artifact spaces. The system and methods can use an artifact generation engine to explore the universe of possible artifact spaces. Human-qualitative judgments about the effect of a distortion in a base file cannot be determined by analysis of unlabeled data alone. Thus, deep learning systems have not previously been used to learn a difference metric. For ease of discussion, the example system 100 is described as a digital image processing system, but implementations are not so limited. An example system 100 may also work on other digital files, such as audio files, video segments, etc.

Figure 6:
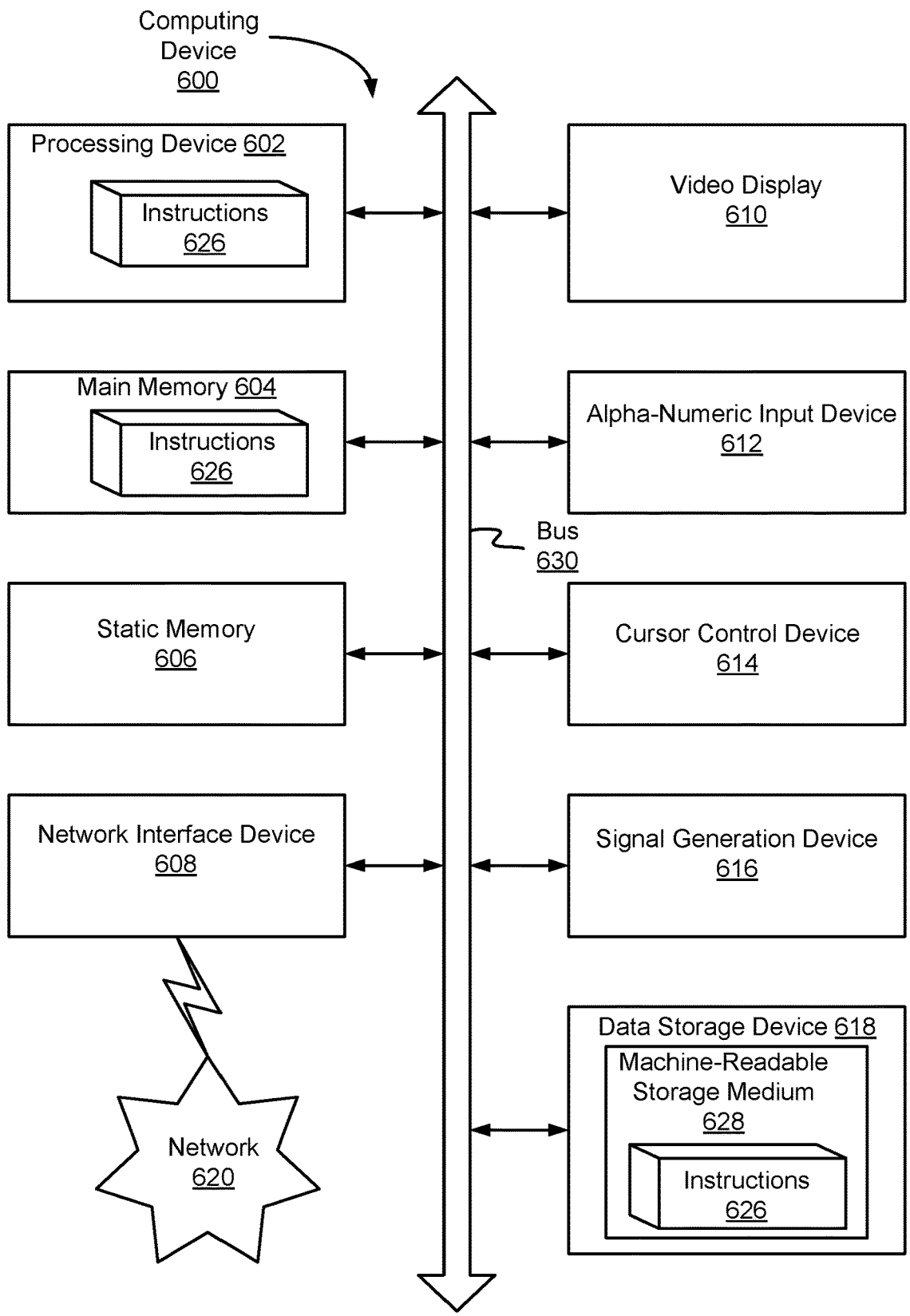
FIG. 6 shows an example of a distributed computer device that can be used to implement the described techniques.

The active learning system 100 may be a computing device or devices that take the form of a number of different devices, for example, a standard server, a group of such servers, or a rack server system. In addition, system 100 may be implemented in a personal computer, for example, a laptop computer. The active learning system 100 may be an example of computer device 600, as depicted in FIG. 6.

The active learning system 100 can include one or more processors 102 formed in a substrate configured to execute one or more machine executable instructions or pieces of software, firmware, or a combination thereof. The processors 102 can be semiconductor-based—that is, the processors can include semiconductor material that can perform digital logic. The active learning system 100 can also include an operating system and one or more computer memories, for example, a main memory, configured to store one or more pieces of data, either temporarily, permanently, semi-permanently, or a combination thereof. The memory may include any type of storage device that stores information in a format that can be read and/or executed by the one or more processors. The memory may include volatile memory, non-volatile memory, or a combination thereof, and store modules that, when executed by the one or more processors, perform certain operations. In some implementations, the modules may be stored in an external storage device and loaded into the memory of system 100.

The active learning system 100 includes base images 104. Base images 104 represent original image data. Put another way the base images 104 are the standard against which the distorted images are measured against. In this sense, the base images 104 are considered ideal images. The base images 104 are stored in a memory. The base images 104 may be stored on memory local to the active learning system 100 or may be stored on memory remote from but accessible to (e.g., via a network) the active learning system 100. The base images 104 can be in any image file format.

The modules in the active learning system 100 include an artifact engine 170 that introduces a distortion, also referred to as a corruption, into the base images 104. In some implementations, the artifact engine 170 may introduce random distortions into the base images 104. In some implementations, the artifact engine 170 may introduce a distortion for a particular artifact space into the base images 104. In some implementations, the artifact engine 170 may operate on parameters provided by a system administrator. The artifact space may be dependent upon one or more of the parameters. For example, an administrator may use a parameter to introduce more blocking artifacts and/or less salt and pepper noise. As another example, a parameter may control the local intensity of certain types of distortions at different positions within an image. The space of all possible corruptions is large, as any modification to one or more pixels of the image data is a corruption. But not all corruptions result in loss of perceived quality. The artifact engine 170 can be used to generate corrupted base images for any number of artifact spaces so that the learned difference metric can operate in diverse artifact spaces. The artifact engine 170 may store the corrupted base image in unlabeled distortion pairs 120. In some implementations, the corrupted base image may be stored with the base image in unlabeled distortion pairs 120. In some implementations, the corrupted base image may be stored with an identifier for the base image, so that the system 100 can determine which base image the corrupted image corresponds to. In some implementations, the artifacts in the corrupted base image may be generated to replicate artifacts in the real word. For example, the artifact engine 170 may use the same encoders that are used in known applications, such as video streaming or image sharing. The artifact engine 170 can use known parameters for the encoders to generate the distortions and artifacts. In some implementations, the encoders may be, for example, jpeg encoders for images or h.264 for videos.

In some implementations, the unlabeled distortion pairs 120 may be stored in a memory of the system 100. In some implementations, unlabeled distortion pairs 120 may be stored in a memory remote from, but accessible to (e.g., via a network) the system 100. The objects in the unlabeled distortion pairs 120 are far more numerous (e.g., by orders of magnitude) than the objects in labeled distortion pairs 105. The unlabeled distortion pairs 120 have the same format or structure as the labeled distortion pairs 105, but lack a corresponding perceptual loss score. A perceptual loss score is a measurement of how bad or how noticeable the distortion is to a human viewer. The images in the unlabeled distortion pairs 120 may be dynamic. In other words, the images in the unlabeled distortion pairs 120 may change frequently, with new pairs being added by the artifact engine 170. In some implementations, there can be a constant supply of unlabeled distortion pairs 120 that have not been used to train the committee members. In some implementations, the artifact engine 170 may generate the unlabeled distortion pairs 120 periodically.

The modules in the active learning system 100 may also include a labeling user interface (UI) 130. The labeling user interface 130 may be configured to present one or more unlabeled distortion pairs to the user as a psychophysics task. In a psychophysics task stimuli are presented to a human subject and a response is recorded. Psychophysics tasks are designed so that the response is informative of perceptual quality. For example, the labeling UI 130 may ask a human rater if any visible difference is detected between the images in the distortion pair. As another example, the labeling UI 130 may present three images to the human rater and ask which image is the odd-one-out. For example, the system may provide a high-quality version of the base image, a low-quality version of the base image, and the corrupted base image generated by the artifact engine 170. This type of interface may enable the system to determine whether the generated image is closer to the high-quality version or the low-quality version. The labeling UI 130 may use any standard psychophysics tasks and associated best practices for how the tasks are designed.

In some implementations, the labeling UI 130 may provide the same unlabeled distortion pair to several human raters and receive several potential perceptual loss scores for the distortion pair. The system 100 may aggregate the potential perceptual loss scores in some manner, e.g., majority vote, averaging, dropping low and high and then averaging, etc., to generate the label 131 for the distortion pair. The label 131 is a perceptual loss score indicative of how the human rater deems the quality of the distorted image in comparison with the original image. Once the system 100 receives a label 131 for a particular unlabeled distortion pair 120, the system stores the distortion pair in labeled distortion pairs 105. The labeled distortion pairs 105 can be used to initialize or re-train the committee members in the perceptual loss committee 150.

The active learning system 100 thus includes labeled distortion pairs 105. Labeled distortion pairs 105 may be stored in a memory. In some implementations, the labeled distortion pairs 105 may be stored in a memory remote from, but accessible (e.g., via a network) to, the system 100. In some implementations, the labeled distortion pairs 105 may be stored in the same memory as the unlabeled distortion pairs 120 and differentiated from unlabeled distortion pairs 120 in that the labeled distortion pairs 105 have an associated perceptual loss score that the unlabeled distortion pairs 120 lack. The labeled distortion pairs 105 represent input data points for the deep neural networks that make up the members of the perceptual loss committee 150. The labeled distortion pairs 105 represent a base image, e.g., from base images 104, and a version of the base image with a distortion. The distortion is caused by some corruption of the base image, e.g., some artifact. In some implementations, the base image 104 is corrupted by an artifact engine 170, as described above.

In some implementations, the labeled distortion pairs 105 can include positive training examples. Positive training examples are data points that tell the deep neural network that the input distortion pair should result in the difference metric score that the human rater has provided. In some implementations, the labeled distortion pairs 105 can include negative training examples. In some implementations, the labeled distortion pairs 105 may be represented as a feature vector or two feature vectors describing the underlying images. A feature vector is an array of numbers, typically floating point numbers, where each position in the array represents a different attribute or signal about the object. Thus, for example, a feature vector may represent different attributes about the image file. A labeled distortion pair may be one feature vector for the base image and another feature vector for the distorted image. Any known or later developed method may be used to generate a feature vector for an image file. Reference to the distortion pairs as used herein can refer to the image files or to a feature vector, or some other signal or data point that represents the image files.

The modules in the active learning system 100 include a training set generator 110. The training set generator 110 may generate different training sets of data from the labeled distortion pairs 105. Each training set is differently subsampled and/or reweighed from the other sets. For example, if the labeled distortion pairs 105 includes five labeled distortion pairs, the training set generator 110 may generate a first training set with only three of the five labeled distortion pairs, a second training set with four of the five labeled distortion pairs, but with a first labeled distortion pair given a higher weight (so that the deep neural network puts greater emphasis on this example), and generate a third training set with all five objects, but with two of the three given a higher weight, etc. This technique is known as Bayesian bootstrapping, and was first described by Rubin in "The Bayesian Bootstrap," (1981) available at https://projecteuclid.org/euclid.aos/1176345338. While Bayesian bootstrapping has been used in other problems, it has not been used with deep neural networks, especially for active learning.

The active learning system 100 also includes a perceptual loss committee 150 that includes a plurality of committee members. Each committee member is a deep neural network, e.g. deep neural network 150_1, deep neural network 150_2, through deep neural network 150_n where n represents any integer greater than 3. As each committee member consumes additional computational resources, there is a balance between resource consumption and gains from adding additional committee members. The value of n is dependent on the application of the difference metric and practical considerations/available resources. In the active learning system 100 each committee member is initialized using a different training set of the training sets generated by the training set generator 110. Because each training set is different from the other training sets, each deep neural network (i.e., each committee member) is initially trained with different assumptions. This means that each committee member makes mistakes in the perceptual loss score provided for a distortion pair, but the mistakes made by the different members are independent of each other.

The modules in the active learning system 100 also include a label evaluator 140. After the committee members in the perceptual loss committee 150 have been initialized, the label evaluator 140 is configured to receive the predicted perceptual loss score from each of the various committee members in the perceptual loss committee 150 for a specific unlabeled distortion pair, e.g., from unlabeled distortion pairs 120. For example, after initialization, the system 100 may provide a large number of unlabeled distortion pairs 120 to the committee members in the perceptual loss committee 150. Each committee member provides a perceptual loss score as output for each unlabeled distortion pair. The label evaluator 140 may evaluate the diversity of the scores to determine whether the predictions for the unlabeled distortion pair satisfy a diversity metric. The diversity metric measures how much variance exists in the scores. In some implementations, any unlabeled distortion pairs that meet some threshold satisfy the diversity metric. In some implementations, some quantity of unlabeled distortion pairs having the highest diversity satisfy the diversity metric (e.g., ten distortion pairs with highest diversity). In some implementations, the diversity metric may represent the difference metric scores for which the parameters under the posterior disagree about the outcome the most. In some implementations, the label evaluator 140 may use a Bayesian Active Learning by Disagreement (BALD) criteria as the diversity metric. The BALD criteria is described by Houlsby et al. in "Bayesian Active Learning for Classification and Preference Learning," (2011), available at https://pdfs.semanticscholar.org/7486/e148260329785fb347ac6725bd4123d8dad6.pdf. In some implementations, the label evaluator 140 may use a maximum entropy search, which queries the distortion pairs having the score with highest uncertainty. In some implementations, the label evaluator 140 may employ 'vote diversity' where each classifier gives a vote as to what the loss score will be, and the label evaluator 140 selects distortion pairs having an average close to 0.5 (e.g., representing high level of disagreement). This has the same issues as maximum entropy search but as it introduces some noise, in practice it may explore better.

The label evaluator 140 may identify any unlabeled distortion pairs that satisfy the diversity metric as informative distortion pairs 115. Identification can be accomplished in any manner, such as setting a flag or attribute for the unlabeled distortion pair, saving the unlabeled distortion pair or an identifier for the unlabeled distortion pair in a data store, etc.

The active learning system 100 may use the labeling UI 130 to obtain labels, e.g., perceptual loss scores, for the informative distortion pairs 115. The labeling UI 130 works the same way, e.g., using psychophysics tasks, to obtain the label for the informative distortion pairs 115 as described above. Once the informative object receives a label 131 via the labeling UI 130, the informative distortion pair can be stored in labeled distortion pairs 105 and used to re-train the committee members in the perceptual loss committee 150. In other words, the system 100 may undergo an iterative training process, where newly labeled distortion pairs are provided for further training the perceptual loss committee, unlabeled distortion pairs are provided to the re-trained perceptual loss committee to identify additional informative distortion pairs, the additional informative distortion pairs are labeled, and then used to retrain the committee members. In some implementations, these iterations can occur for a number or rounds. In some implementations, the iterations can occur until the scores for the deep neural networks converge. In other words, after several rounds of re-training there may not be sufficient diversity in the output of the committee members. This indicates convergence is reached and any of the deep neural networks, e.g., 150_1 to 150_n, can be used as the learned difference metric 180. The system may provide the learned difference metric 180 to image processing systems that use machine-learning. The difference metric may be the objective function that the machine-learning task tries to optimize (e.g., tries to achieve a score that indicative of a high quality).

Although not illustrated in FIG. 1, active learning system 100 may be in communication with client(s) over a network. The clients may enable a human rater to provide the label 131 via the labeling UI 130 to the active learning system 100. Clients may also allow an administrator to provide parameters to the active learning system 100. Clients may also allow an administrator to control timing, e.g., to start another round of re-training after human raters have provided labels for some or all of the outstanding informative distortion pairs 115, provide parameters to the artifact engine 170, or to start a round of inference, where committee members provide output and the system identifies additional informative distortion pairs. Clients may also enable an administrator to provide additional locations of unlabeled distortion pairs 120. The network may be for example, the Internet or the network can be a wired or wireless local area network (LAN), wide area network (WAN), etc., implemented using, for example, gateway devices, bridges, switches, and/or so forth. In some implementations, active learning system 100 may be in communication with or include other computing devices that provide updates to the unlabeled distortion pairs 120 or to labeled distortion pairs 105. In some implementations, active learning system 100 may be in communication with or include other computing devices that store one or more of the pairs, e.g., labeled distortion pairs 105, unlabeled distortion pairs 120, or informative distortion pairs 115. Active learning system 100 represents one example configuration and other configurations are possible. In addition, components of system 100 may be combined or distributed in a manner differently than illustrated. For example, in some implementations one or more of the training set generator 110, the label evaluator 140, the labeling UI 130, and the artifact engine 170 may be combined into a single module or engine. In addition, components or features of the training set generator 110, the label evaluator 140, the labeling UI 130, and the artifact engine 170 may be distributed between two or more modules or engines.

Figure 2:
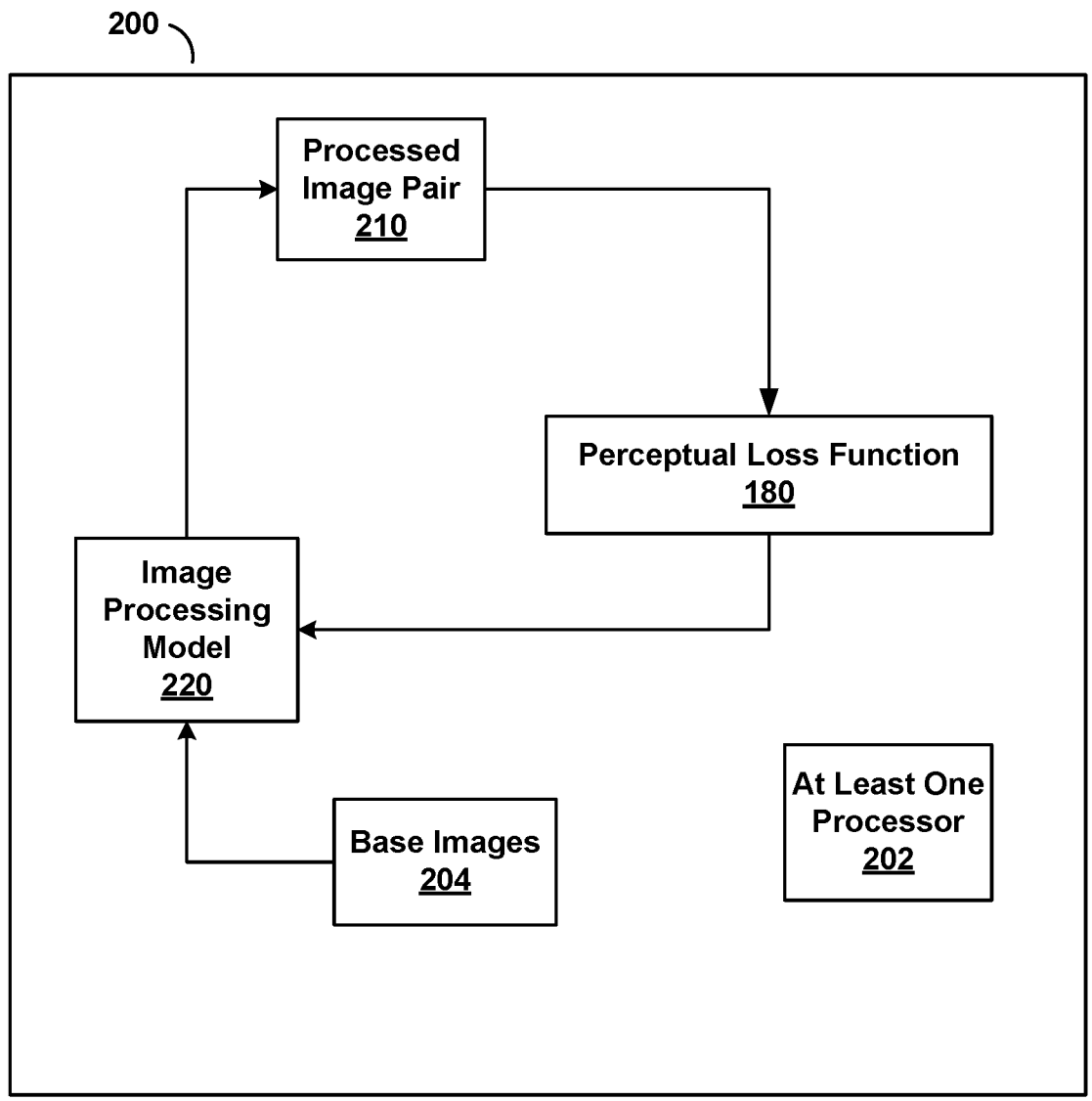
FIG. 2 illustrates an example system for using the difference metric, in accordance with the disclosed subject matter.

FIG. 2 illustrates an example system for using the difference metric, in accordance with the disclosed subject matter. The image processing system 200 may be a computing device or devices that take the form of a number of different devices, for example, a standard server, a group of such servers, or a rack server system. In addition, image processing system 200 may be implemented in a personal computer, for example, a laptop computer. The image processing system 200 may be an example of computer device 600, as depicted in FIG. 6.

The image processing system 200 can include one or more processors 202 formed in a substrate configured to execute one or more machine executable instructions or pieces of software, firmware, or a combination thereof. The processors 202 can be semiconductor-based—that is, the processors can include semiconductor material that can perform digital logic. The image processing system 200 can also include an operating system and one or more computer memories, for example, a main memory, configured to store one or more pieces of data, either temporarily, permanently, semi-permanently, or a combination thereof. The memory may include any type of storage device that stores information in a format that can be read and/or executed by the one or more processors. The memory may include volatile memory, non-volatile memory, or a combination thereof, and store modules that, when executed by the one or more processors, perform certain operations. In some implementations, the modules may be stored in an external storage device and loaded into the memory of system 200.

The image processing system 200 includes base images 204. Base images 204 represent the original image data, or in other words the input data for the image processing model 220. The base images 204 are stored in a memory. The base images 204 may be stored on memory local to the image processing system 200 or may be stored on memory remote from but accessible to (e.g., via a network) the image processing system 200. The base images 104 can be in any image file format and can include a frame of a video. In some implementations, the base images 204 can be the same images as base images 104.

The modules in the image processing system 200 include an image processing model 220. The image processing model 220 represents an image task, such as compression, image enhancement, etc., performed by the image processing system 200. The image processing model 220 takes as input an image, e.g., a base image from base images 204, and provides, as output, a modified image. The image processing model 220 may be a linear regression model, a neural network, a deep neural network, support vector machine, a random forest, a decision tree(s)/forest, random fern, hash map, k nearest neighbor(s) model, Gaussian processes, etc. During training of the image processing model 220, the image processing system 200 may evaluate the output of the image processing model 220 against the base image using the difference metric 180. For example, if the image processing model 220 is an image compression model, the system 200 may evaluate the compressed image with its corresponding base image using the difference metric 180. For example, the compressed image and the base image may be a processed image pair 210 that is provided as input into the difference metric 180. The difference metric 180 provides an output, e.g., a perceptual loss score that helps the image processing model 220 know whether the compression method was better or worse than another compression method. This occurs many times and helps the image processing model 220 discover the best compression method and the best parameters for that method. The image processing system 200 may be communicatively connected to active learning system 100 and may receive an updated difference metric 180 periodically. For example, the active learning system 100 may continue to train the committee on additional artifact spaces, thus improving the difference metric. Such improvements may be provided in the form of an updated difference metric 180.

Figure 3:
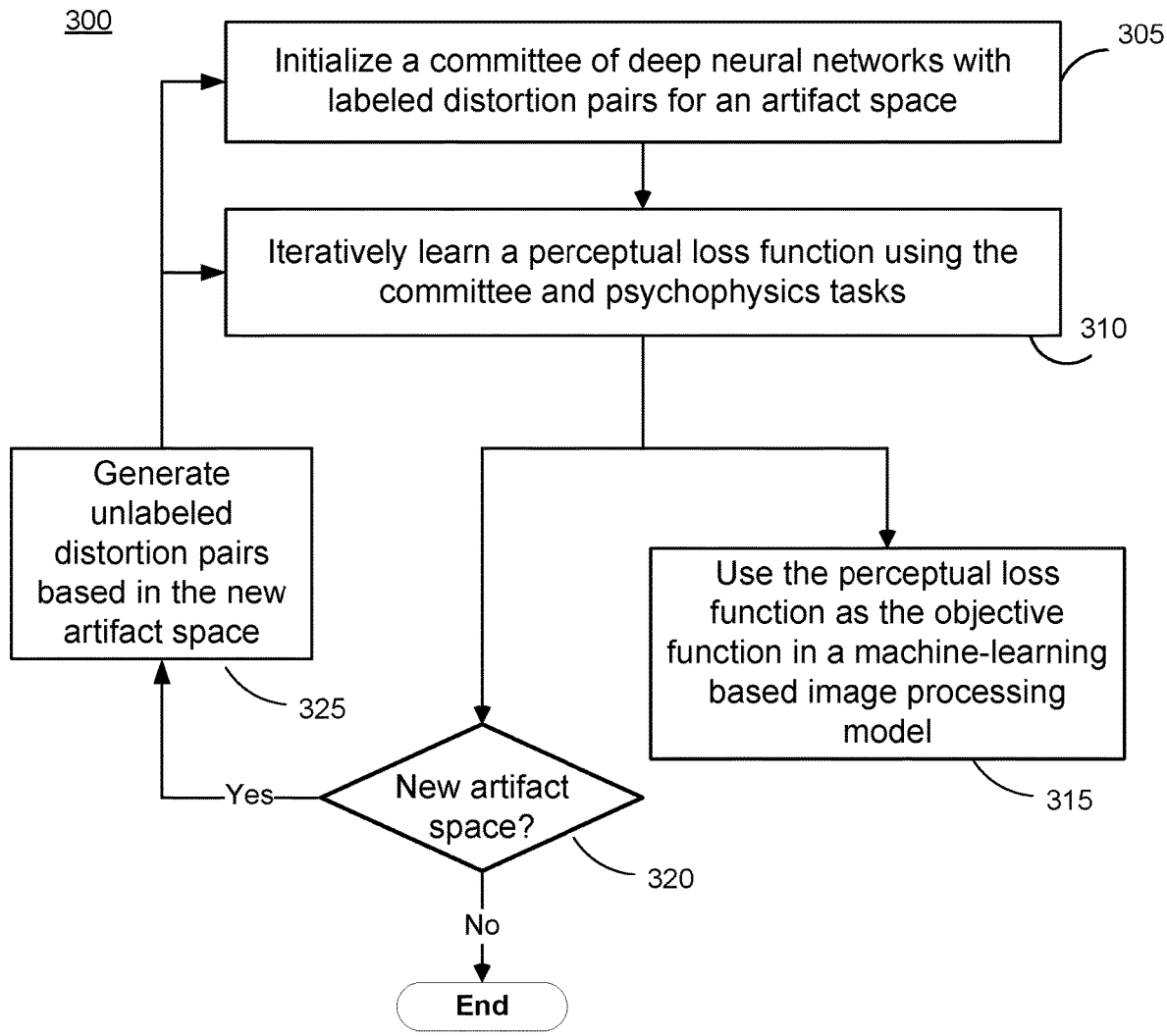
FIG. 3 illustrates a flow diagram of an example process for using a difference metric using psychophysics tasks, in accordance with disclosed subject matter.

FIG. 3 illustrates a flow diagram of an example process 300 for using a difference metric using psychophysics tasks, in accordance with disclosed subject matter. Process 300 may be performed by an active learning system, such as system 100 of FIG. 1 and/or an image processing system, such as system 200 of FIG. 2. Process 300 may begin with the active learning system initializing a committee having a plurality of committee members (305). Each of the committee members is a deep neural network. Each of the committee members is trained on a different set of labeled distortion pairs. The sets may be determined using Bayesian bootstrapping. A labeled distortion pair represents a base image and a modified base image, the modification being a distortion in an artifact space. The pair may be the image data or a vector representing the image data. The number of committee members may be large, e.g., 100 or more. Once the committee is initialized, the active learning system may perform iterative rounds of active training, using psychophysics tasks to obtain new training data for each iteration (310). A round of training includes using the committee members to identify distortion pairs with high diversity in the perceptual loss scores provided by the various committee members, obtaining labels for the informative distortion pairs via psychophysics tasks, and re-training the committee members with the newly labeled pairs. Once the difference metric is learned, it may be used as the objective function in a machine-learning based image processing task (315). In addition, the active learning system may continue learning, or in other words expanding, the difference metric. In some implementations, the system may explore new artifact spaces (320, Yes). In such implementations, the system may generate unlabeled distortion pairs based on the new artifact space (325). In this manner the system can systematically explore all artifact spaces. In some implementations, the system may just continue generating random distortions for unlabeled distortion pairs, which may not be confined to an artifact space. The exploration of artifact spaces uses the Bayesian bootstrapping and feedback discussed above.

Figure 4:
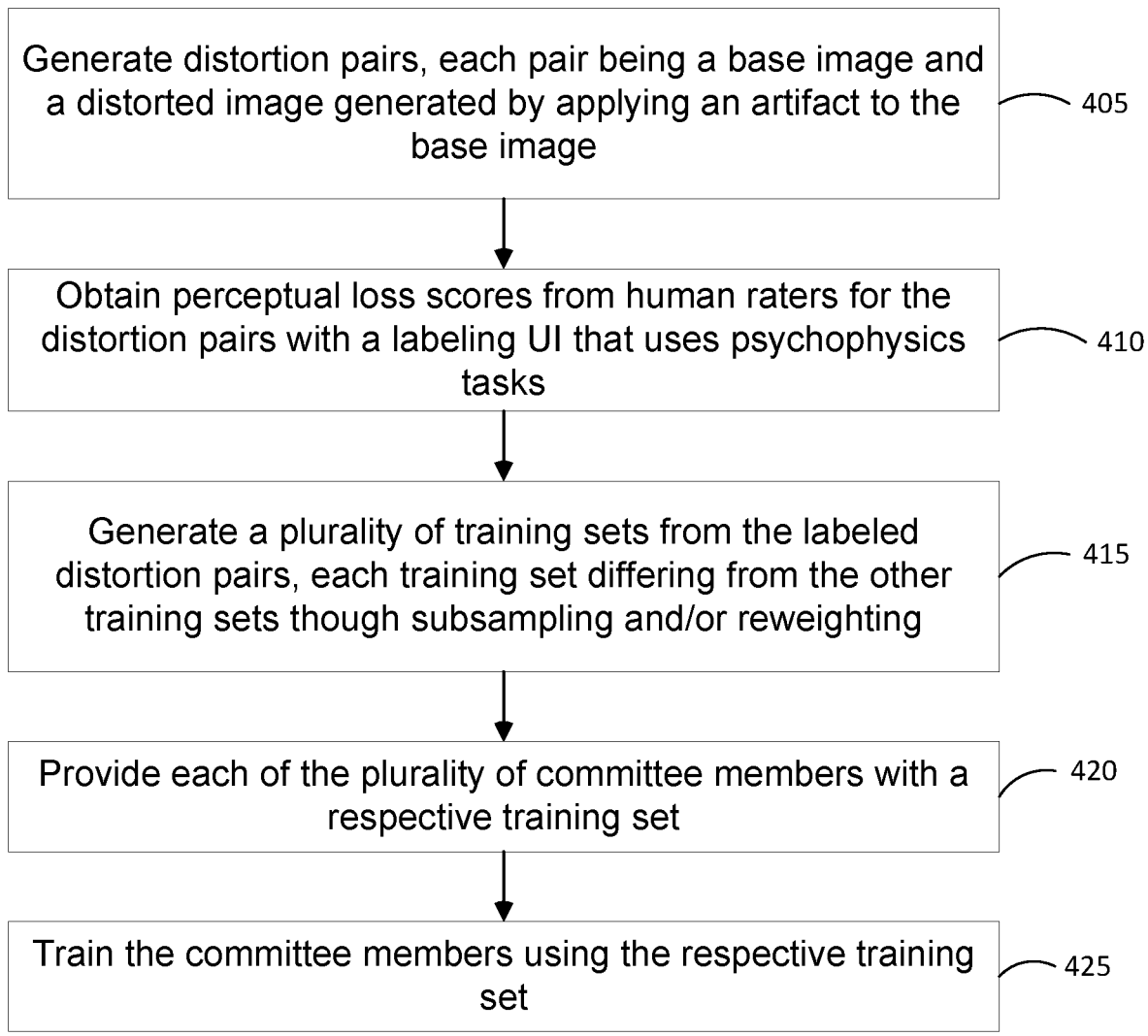
FIG. 4 illustrates a flow diagram of an example process for initializing a committee of deep neural networks to train the difference metric, in accordance with disclosed subject matter.

FIG. 4 illustrates a flow diagram of an example process 400 for initializing a committee of deep neural networks to train the difference metric, in accordance with disclosed subject matter. Process 400 may be performed by an active learning system, such as system 100 of FIG. 1, as part of step 305 of FIG. 3. Process 400 may begin with the active learning system generating distortion pairs (405). A distortion pair is a base image and an image that includes a distortion of the base image. The second image is referred to as a distorted image. The distortion is some change in the image data generated by applying an artifact to the base image. In some implementations, the system may seek to apply artifacts that provide maximum information for the difference metric; in other words the goal of the system is to adaptively select stimuli (artifacts) to achieve accuracy in the learned difference metric with fewer trials than random artifact selection. Thus the system may select an artifact space based on previous rounds of training, e g., for a different artifact space. Common example artifacts include blurring, additive white noise, blockiness, etc., but an artifact can be any change to the underlying image data. The system may obtain a difference metric score from a human rater (or raters) for each of the distortion pairs (410). The system may use standard psychophysics tasks to obtain the difference metric score. The psychophysics tasks are designed to elicit a response that is informative of perceptual quality between the pair of images. The distortion pairs that receive a perceptual loss score from a human rater is a labeled distortion pair.

The system may generate a plurality of training sets from the labeled distortion pairs (415). Each of the plurality of training sets differs from the other training sets in the plurality of training sets. The differences may be due to subsampling. For example, different training sets may include different distortion pairs from the labeled distortion pairs. The differences may be due to reweighting. For example, a training set may upweight or downweight a labeled distortion pair from the labeled distortion pairs, so that the deep neural network gives that labeled distortion pair more weight (upweight) or less weight (downweight) during initialization. The differences may be due to a combination of subsampling and reweighting. The subsampling may be randomized. The reweighting may be randomized. In some implementations the training sets may be generated via Bayesian bootstrapping.

The system may provide each committee member with a respective training set (420). Thus, no two committee members receive the same training set. This means that once initialized the committee members will make different errors in the output, but that the errors are randomized. The system may then train the committee members using their respective training set (425). Once the training is completed, process 400 ends and the system has initialized the committee. The committee members may be used to identify additional distortion pairs for labeling, i.e., informative distortion pairs. The committee members may be re-trained on labeled informative distortion pairs, as discussed with regard to FIG. 5.

Figure 5:
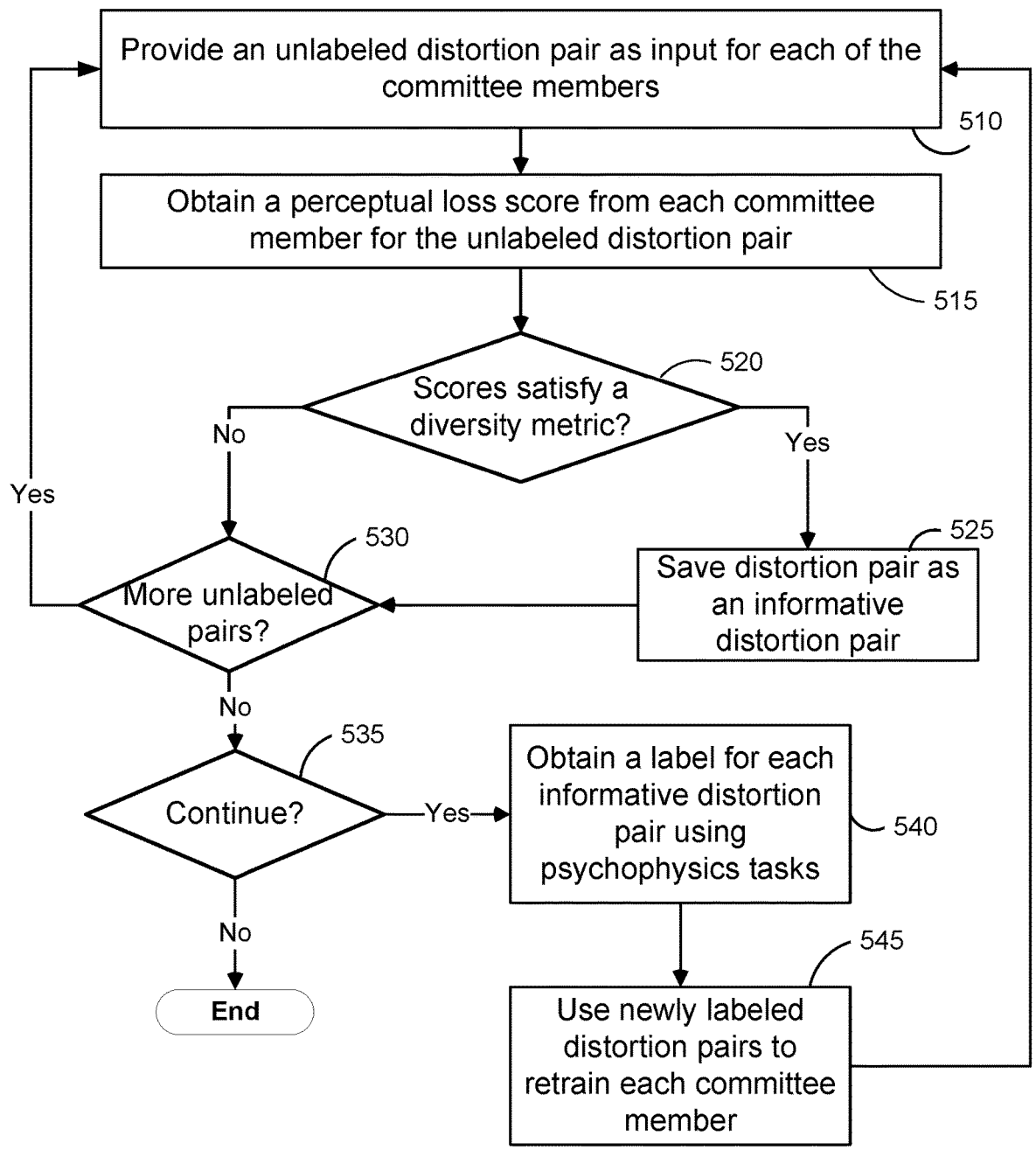
FIG. 5 illustrates a flow diagram of an example process for iterative learning of a difference metric using psychophysics tasks, in accordance with disclosed subject matter.

FIG. 5 illustrates a flow diagram of an example process 500 for iterative learning of a difference metric using psychophysics tasks, in accordance with disclosed subject matter. Process 500 may be performed by an active learning system, such as system 100 of FIG. 1, as part of step 310 of FIG. 3. Process 500 may begin with the active learning system providing an unlabeled distortion pair as input to each of the committee members (510). Each committee member provides a predicted perceptual loss score (515).

The active learning system determines whether the predicted perceptual loss scores from the various committee members satisfies a diversity metric (520). The diversity metric measures how much variance exists across the scores for that distortion pair. High variance indicates the unlabeled distortion pair is informative. In other words, the committee members are not good at successfully predicting the perceptual loss score for this pair and having a human rater label the pair with a perceptual loss score will help the deep neural networks learn the proper score more quickly. In some implementations, BALD criteria is used to determine whether the scores satisfy the diversity metric. In some implementations, if the variance in the scores for the unlabeled distortion pair meets or exceeds a variance threshold, the scores satisfy the diversity metric. In some implementations, if the unlabeled distortion pair is among some quantity of pairs with the highest diversity, e.g., the highest 10 pairs, the scores satisfy the diversity metric.

If the scores satisfy the diversity metric (520, Yes), the system saves or flags the unlabeled distortion pair as an informative distortion pair (525). The system may repeat steps 510-525 with a number of different unlabeled distortion pairs (530, Yes). The number may represent the entirety of the distortion pairs in an unlabeled data repository (e.g., unlabeled distortion pairs 120 of FIG. 1) or a subset of the distortion pairs in the unlabeled data repository. In some implementations, an artifact generation engine may produce the unlabeled distortion pairs. Once the system has run some quantity of unlabeled distortion pairs through the committee (530, No), the system may determine whether to continue or not (535). In some implementations, the system may continue (535, Yes) until the system has performed a predetermined number of iterations of steps 510 to 545. In some implementations, the system may continue iterations until convergence is reached. Convergence may be reached based on the number of informative distortion pairs identified. For example, if no informative distortion pairs are identified in the most recent iteration, the system may have reached convergence. As another example, convergence may be reached when only a few (less than some quantity) of informative distortion pairs are identified in the most recent iteration. As another example, convergence may be reached when the divergence represented by the scores for the informative distortion pairs fails to meet a diversity threshold. If convergence is not reached, the system may continue with iterations.

If the system continues (535, Yes), the system may obtain a label from a human rater for each informative distortion pair identified in the iteration (540). The human rater may provide a label via a user interface that presents information about the informative distortion pair in a psychophysics task to the rater, who then provides a perceptual loss score for the pair. In some implementations, the information about a given informative distortion pair may be presented to several human raters and the system may aggregate the labels in some manner (e.g., voting, averaging, weighted averaging, standard deviation, etc.) The labeling of informative distortion pairs may occur over several days. When labels are obtained, the system may provide the newly labeled distortion pairs to re-train each committee member (545). After re-training, the system may then start another iteration to determine whether convergence or the number of iterations is reached. Once convergence is reached or the number of iterations is reached (535, Yes), process 500 ends. At this point the active learning system has learned a strong difference metric, which can be represented by any one of the committee members.

FIG. 6 illustrates a diagrammatic representation of a machine in the example form of a computing device 600 within which a set of instructions, for causing the machine to perform any one or more of the methodologies discussed herein, may be executed. The computing device 600 may be a mobile phone, a smart phone, a netbook computer, a rackmount server, a router computer, a server computer, a personal computer, a mainframe computer, a laptop computer, a tablet computer, a desktop computer etc., within which a set of instructions, for causing the machine to perform any one or more of the methodologies discussed herein, may be executed. In one implementation, the computing device 600 may present an overlay UI to a user (as discussed above). In alternative implementations, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computing device 600 includes a processing device (e.g., a processor) 602, a main memory 604 (e.g., read-only memory (ROM), flash memory, dynamic random access memory (DRAM) such as synchronous DRAM (SDRAM)), a static memory 606 (e.g., flash memory, static random access memory (SRAM)) and a data storage device 618, which communicate with each other via a bus 630.

Processing device 602 represents one or more general-purpose processing devices such as a microprocessor, central processing unit, or the like. More particularly, the processing device 602 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 602 may also be one or more special-purpose processing devices such as an application specific integrated circuit (ASIC), a field programmable gate array (FPGA), a digital signal processor (DSP), network processor, or the like. The processing device 602 is configured to execute instructions 626 (e.g., instructions for an application ranking system) for performing the operations and steps discussed herein.

The computing device 600 may further include a network interface device 608 which may communicate with a network 620. The computing device 600 also may include a video display unit 610 (e.g., a liquid crystal display (LCD) or a cathode ray tube (CRT)), an alphanumeric input device 612 (e.g., a keyboard), a cursor control device 614 (e.g., a mouse) and a signal generation device 616 (e.g., a speaker). In one implementation, the video display unit 610, the alphanumeric input device 612, and the cursor control device 614 may be combined into a single component or device (e.g., an LCD touch screen).

The data storage device 618 may include a computer-readable storage medium 628 on which is stored one or more sets of instructions 626 (e.g., instructions for the application ranking system) embodying any one or more of the methodologies or functions described herein. The instructions 626 may also reside, completely or at least partially, within the main memory 604 and/or within the processing device 602 during execution thereof by the computing device 600, the main memory 604 and the processing device 602 also constituting computer-readable media. The instructions may further be transmitted or received over a network 620 via the network interface device 608.

While the computer-readable storage medium 628 is shown in an example implementation to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media and magnetic media. The term "computer-readable storage medium" does not include transitory signals.

In the above description, numerous details are set forth. It will be apparent, however, to one of ordinary skill in the art having the benefit of this disclosure, that implementations of the disclosure may be practiced without these specific details. Moreover, implementations are not limited to the exact order of some operations, and it is understood that some operations shown as two steps may be combined and some operations shown as one step may be split. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "identifying," "determining," "calculating," "updating," "transmitting," "receiving," "generating," "changing," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Implementations of the disclosure also relate to an apparatus for performing the operations herein. This apparatus may be specially constructed for the required purposes, or it may comprise a general purpose computer selectively activated or reconfigured by a computer program stored in the computer. Such a computer program may be stored in a non-transitory computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an implementation" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

The algorithms and displays presented herein are not inherently related to any particular computer or other apparatus. Various general purpose systems may be used with programs in accordance with the teachings herein, or it may prove convenient to construct a more specialized apparatus to perform the required method steps. The required structure for a variety of these systems will appear from the description below. In addition, the present disclosure is not described with reference to any particular programming language. It will be appreciated that a variety of programming languages may be used to implement the teachings of the disclosure as described herein.

In one aspect, a method includes initializing a committee of deep neural networks with labeled distortion pairs, iteratively actively learning a difference metric using the committee and psychophysics tasks for informative distortion pairs, and using the difference metric as an objective function in a machine-learned digital file processing task.

These and other aspects can include one or more of the following features. For example, iteratively actively learning the difference metric can include providing an unlabeled distortion pair as input to each of the deep neural networks in the committee, a distortion pair being a base image and a distorted image, the distorted image resulting from application of an artifact applied to the base image, obtaining a plurality of difference metric scores for the unlabeled distortion pair, each difference metric score being obtained from one of the deep neural networks, determining whether the plurality of difference metric scores satisfy a diversity metric, and identifying the unlabeled distortion pair as an informative distortion pair when the difference metric scores satisfy the diversity metric. In some such implementations, convergence can be reached when no unlabeled distortion pairs have a plurality of difference metric scores that satisfy the diversity metric, Iteratively actively learning the difference metric may terminate after diversity in the plurality of difference metric scores fails to meet a diversity threshold, determining whether the plurality of difference metric scores satisfies the diversity metric may include using Bayesian Active Learning by Disagreement, and/or some unlabeled distortion pairs may be generated by an artifact engine. Also in some such implementations, the method may also include providing the informative distortion pair to a human rater, receiving a label for the informative distortion pair from the human rater using a psychophysics task, and retraining the deep neural networks using the labeled informative distortion pair.

As another example, initializing the committee of deep neural networks may occur using Bayesian bootstrapping. As another example, actively learning the difference metric may occurs for a predetermined number of iterations. As another example, actively learning the difference metric may occurs until perpetual loss scores generated by the deep neural networks reach convergence. As another example, actively learning the difference metric can include generating at least some unlabeled distortion pairs by an artifact engine, the unlabeled distortion pairs being input provided to the committee and the committee being used to identify the informative distortion pairs. As another example, the digital file processing task may be an image processing task and/or an audio processing task. As another example, the digital file processing task may be lossy compression. As another example, the digital file processing task may be image enhancement and/or audio enhancement.

In one aspect, a computer-readable medium stores a deep neural network that was trained to provide a difference metric, the training including initializing a committee of deep neural networks using different sets of labeled training distortion pairs, and iteratively training the committee of deep neural networks until convergence. Iteratively training the committee of deep neural networks may include identifying a plurality of informative distortion pairs, by providing unlabeled distortion pairs to the committee and selecting the unlabeled distortion pairs with highest diversity in the difference metric scores of the deep neural networks in the committee, obtaining labels for the informative distortion pairs, and retraining the committee of deep neural networks using the labels for the informative distortion pairs.

These and other aspects can include one or more of the following features. For example, an unlabeled distortion pair can include a base image and a distorted image, the distorted image resulting from application of an artifact applied to the base image. As another example, obtaining labels can include providing the informative distortion pair to a human rater, receiving a label for the informative distortion pair from the human rater using a psychophysics task, and retraining the deep neural networks using the labeled informative distortion pair. As another example, convergence may occur responsive to determining diversity in the difference metric scores fails to meet a diversity threshold, responsive to determining no unlabeled distortion pairs have a plurality of difference metric scores that satisfy a diversity metric, and/or responsive to performance of a predetermined number of iterations. As another example, at least some unlabeled distortion pairs may be generated by an artifact engine. As another example, obtaining labels can include providing the informative distortion pair to a human rater as a psychophysics task that includes a third digital file and the informative distortion pair, receiving a label for the informative distortion pair from the human rater, and retraining the deep neural networks using the label for the informative distortion pair.

In another aspect, a system includes at least one processor and memory storing a machine-learned model for performing an image processing task, the model being a deep neural network using a difference metric trained using active learning. The memory also stores instructions that, when executed by the at least one processor, cause the system to perform operations. The operations include receiving an image file, providing the image file to the model, and receiving a processed image file from the model.

In another aspect, a system includes at least one processor and an artifact engine for generating unlabeled distortion pairs. The artifact engine may generate the unlabeled distortion pairs by, for each base file, generating a respective distorted file from the base file. The system also includes a labeling user interface for obtaining labels for unlabeled distortion pairs and a perceptual loss committee. The perceptual loss committee includes a plurality of deep neural networks, each deep neural network having a respective perceptual loss function. The system further includes memory storing instructions that, when executed by the at least one processor, cause the system to perform operations. The operations include learning a perceptual loss function by generating, using the artifact engine, a plurality of unlabeled distortion pairs, obtaining, from the committee, a respective set of perceptual loss scores for each of the plurality of unlabeled distortion pairs, the respective set including a perceptual loss score from each of the deep neural networks, identifying a set of distortion pairs from the plurality of unlabeled distortion pairs, each distortion pair in the set of distortion pairs having a respective set of perceptual loss scores that satisfies a diversity metric, obtaining, using the user interface, a respective labeled perception score for each distortion pair in the set of distortion pairs, and training the deep neural networks using the respective labeled perception score as a training example for the distortion pair. The operations also include using the perceptual loss function as an objective function in a machine-learning based digital file processing task.

These and other aspects may include one or more of the following features. For example, the artifact engine may introduce random distortions into the base files and/or a distortion that is based on a parameter provided by a system administrator. As another example, the user interface may present the distortion pair to a user and receive, from the user, a score informative of perceptual quality. As another example, the artifact engine is configured to generate distorted file in at least two different artifact spaces. As another example, the digital file processing task may be selected from a group including lossy image compression, lossy audio compression, image enhancement, video enhancement, and audio quality enhancement.

What is claimed is:

1. A method comprising:
   initializing a plurality of deep neural networks using different sets of labeled distortion pairs, each deep neural network providing, at an end of initializing, a difference metric for a given distortion pair;
   iteratively actively learning a difference metric using the plurality of deep neural networks and using information indicative of perceptual quality obtained for informative distortion pairs, wherein iteratively actively learning the difference metric includes generating millions of unlabeled distortion pairs by an artifact engine, the unlabeled distortion pairs each being input provided to the plurality of deep neural networks and the plurality of deep neural networks being used to identify, as the informative distortion pairs, unlabeled distortion pairs with highest diversity among difference metrics predicted by the plurality of deep neural networks; and
   using the difference metric as an objective function in a machine-learned digital file processing task.

2. The method of claim 1, wherein identifying the informative distortion pairs with highest diversity includes:
   providing an unlabeled distortion pair as input to each deep neural network in the plurality of deep neural networks,
   obtaining a plurality of difference metric scores for the unlabeled distortion pair, each difference metric score being obtained from one of the deep neural networks;
   determining whether the plurality of difference metric scores satisfy a diversity metric; and
   considering the unlabeled distortion pair for inclusion in the informative distortion pairs when the plurality of difference metric scores for the unlabeled distortion pair satisfy the diversity metric.

3. The method of claim 2, further comprising:
   providing an informative distortion pair of the informative distortion pairs to a human rater;
   receiving a label for the informative distortion pair from the human rater, the label being information indicative of perceptual quality; and
   retraining the plurality of deep neural networks using the labeled informative distortion pair.

4. The method of claim 2, wherein iteratively actively learning the difference metric terminates after diversity in the plurality of difference metric scores fails to meet a diversity threshold.

5. The method of claim 2, wherein convergence is reached when no unlabeled distortion pairs have a plurality of perceptual loss scores that satisfy the diversity metric.

6. The method of claim 2, wherein determining whether the plurality of difference metric scores satisfies the diversity metric includes using Bayesian Active Learning by Disagreement.

7. The method of claim 1, wherein the artifact engine generates random artifacts.

8. The method of claim 1, wherein initializing the plurality of deep neural networks includes:
generating the different sets of labeled distortion pairs using subsampling and reweighting of the labeled distortion pairs.

9. The method of claim 1, wherein actively learning the difference metric occurs for a predetermined number of iterations.

10. The method of claim 1, wherein the artifact engine is configured to generate artifacts in multiple artifact spaces.

11. The method of claim 1, wherein the artifact engine is configured to generate artifacts in multiple artifact spaces based on parameters provided by a system administrator.

12. A computer-readable storage medium storing a deep neural network trained to provide a perceptual loss score by:
initializing a committee of deep neural networks using different sets of labeled training distortion pairs, each deep neural network providing, at an end of initializing, a perceptual loss score for a given distortion pair;
generating a set of millions of unlabeled distortion pairs by an artifact engine; and
iteratively training the committee of deep neural networks until convergence by:
identifying a plurality of informative distortion pairs by obtaining a perceptual loss score from each deep neural network in the committee for each unlabeled distortion pair in the set of unlabeled distortion pairs and selecting, as the plurality of informative distortion pairs, unlabeled distortion pairs from the set of unlabeled distortion pairs having highest diversity in the perceptual loss scores,
obtaining labels for the plurality of informative distortion pairs, and
retraining the deep neural networks of the committee using the labels for the plurality of informative distortion pairs.

13. The computer-readable storage medium of claim 12, wherein the committee includes at least 100 deep neural networks.

14. The computer-readable storage medium of claim 12, wherein the distortion pairs are in a first artifact space and the artifact engine is configured to generate artifacts in a second artifact space and the deep neural network is further trained to provide the perceptual loss score by repeating the initializing and iterative training with distortion pairs generated in the second artifact space.

15. A system comprising:
at least one processor; and
memory storing instructions that, when executed by the at least one processor, cause the system to perform operations including:
learning a perceptual loss function by:
using an artifact engine for generating millions of unlabeled distortion pairs by, for each base file, generating a respective distorted file from the base file,
from a perceptual loss committee that includes a plurality of deep neural networks, each deep neural network having a respective perceptual loss function, obtaining a respective set of perceptual loss scores for each unlabeled distortion pair of the millions of unlabeled distortion pairs, the respective set including a perceptual loss score from each of the deep neural networks,
identifying a set of distortion pairs from the millions of unlabeled distortion pairs, each distortion pair in the set of distortion pairs having a respective set of perceptual loss scores that satisfies a diversity metric,
using a labeling user interface for obtaining labels for unlabeled distortion pairs, obtaining a respective labeled perception score for each distortion pair in the set of unlabeled distortion pairs, and
retraining the plurality of deep neural networks using the set of distortion pairs and respective labeled perception scores as training examples; and
using the perceptual loss function as an objective function in a machine-learning based digital file processing task.

16. The system of claim 15, wherein the artifact engine introduces random distortions into the base files.

17. The system of claim 15, wherein the artifact engine introduces distortions in an artifact space that is based on a parameter provided by a system administrator.

18. The system of claim 15, wherein the labeling user interface presents a distortion pair of the set of distortion pairs to a user and receives, from the user, a score informative of perceptual quality.

19. The system of claim 15, wherein the artifact engine is configured to generate unlabeled distortion pairs having free-form artifacts.

20. The system of claim 15, wherein the machine-learning based digital file processing task is selected from a group including lossy image compression, lossy audio compression, image enhancement, video enhancement, and audio quality enhancement.

* * * * *